Sept. 3, 1940.   A. E. SCHUBERT   2,213,746
FILM WINDING AND GATE OPENING MECHANISM
Original Filed Oct. 7, 1937   3 Sheets-Sheet 1
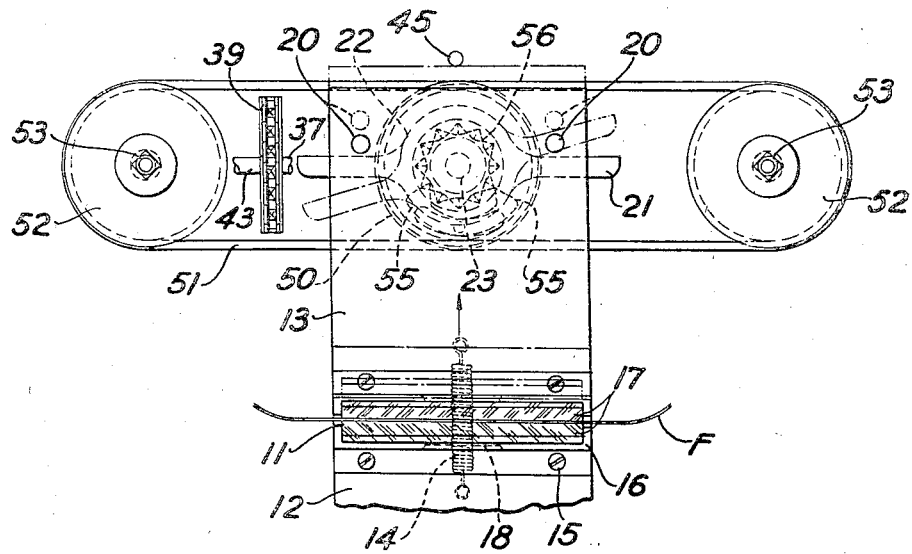
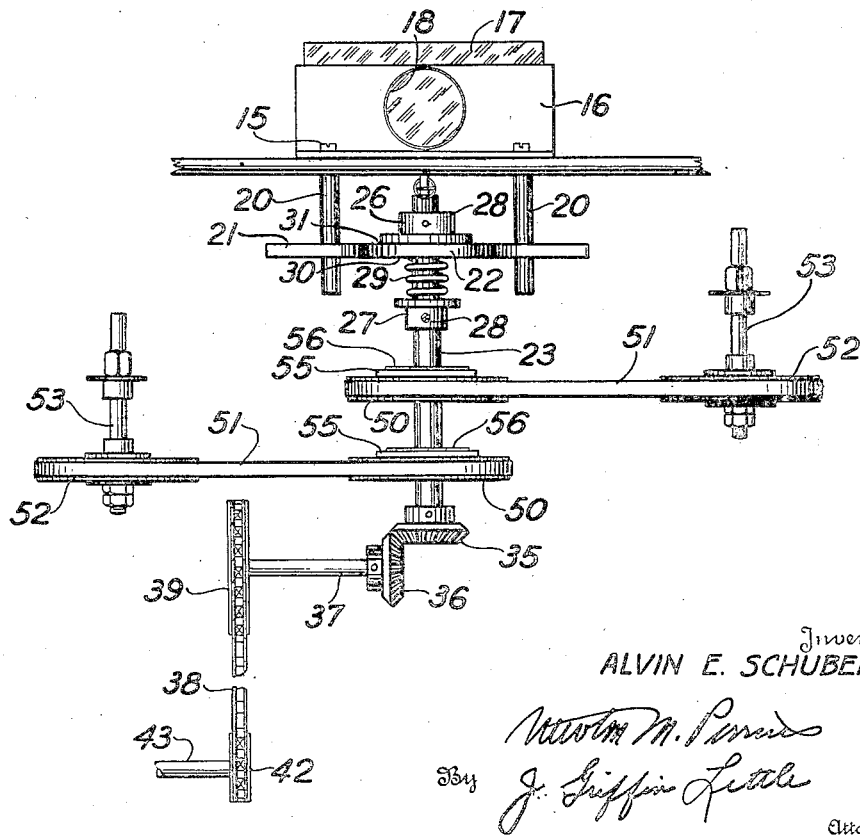
Inventor
ALVIN E. SCHUBERT
By
Attorneys

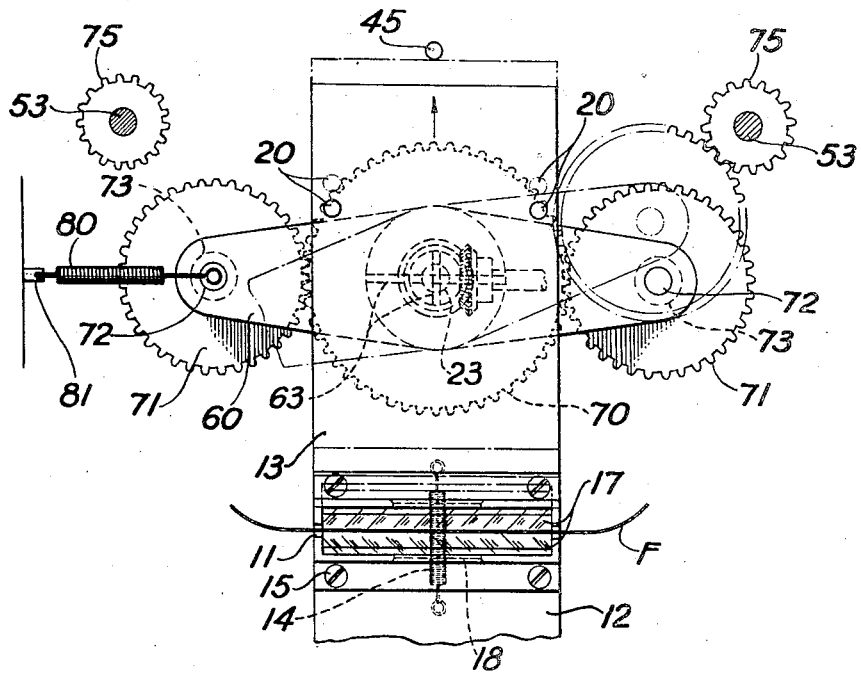
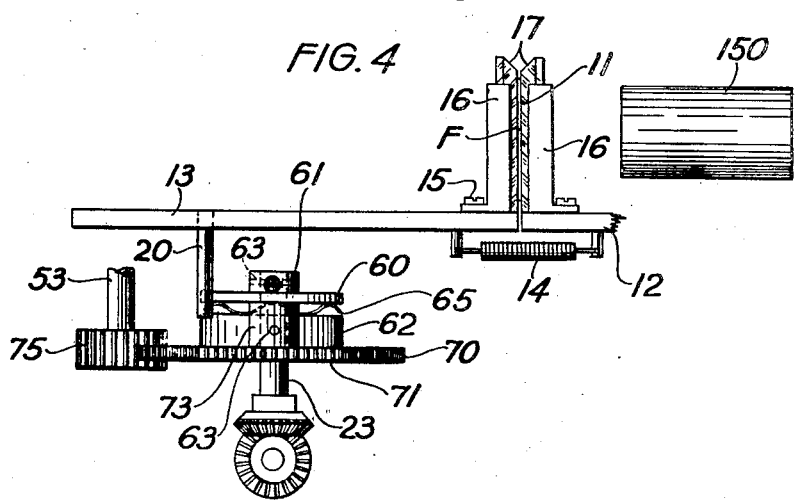

Sept. 3, 1940. A. E. SCHUBERT 2,213,746
FILM WINDING AND GATE OPENING MECHANISM
Original Filed Oct. 7, 1937  3 Sheets-Sheet 3
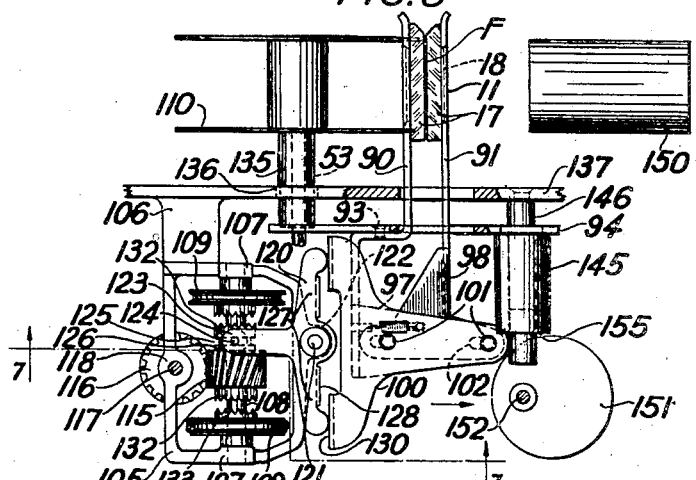
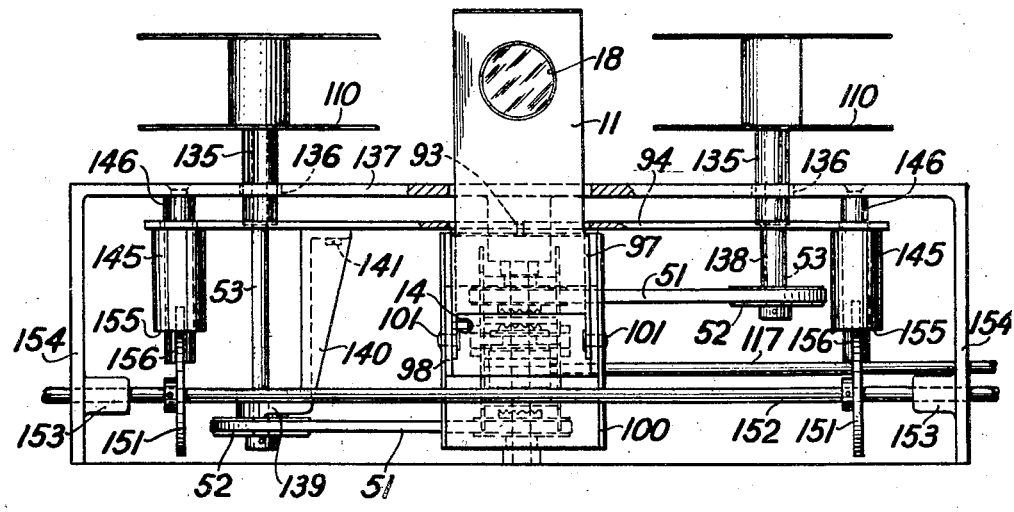
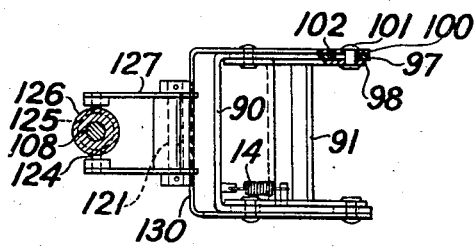
Inventor
ALVIN E. SCHUBERT Patented Sept. 3, 1940

2,213,746

UNITED STATES PATENT OFFICE

2,213,746

FILM WINDING AND GATE OPENING MECHANISM

Alvin E. Schubert, Rochester, N. Y., assignor to Eastman Kodak Company, Rochester, N. Y., a corporation of New Jersey Original application October 7, 1937, Serial No. 167,749. Divided and this application May 12, 1939, Serial No. 273,281

8 Claims. (Cl. 88—28)

The present application is a division of my pending application #167,749, filed October 7, 1937, which has become U. S. Patent 2,165,419, dated July 11, 1939, and relates to a device for producing enlarged images carried by a film strip on a viewing screen, and more particularly to a winding mechanism for both moving the film strip through the film gate and for automatically opening the latter prior to such movement. This mechanism is particularly intended for use with a viewing device of the general type shown and described in the patent to R. S. Hopkins, No. 2,008,982, issued July 23, 1935. It is contemplated, however, that various other forms of viewing devices may be used without departing from the invention and the scope of the appended claims.

One object of the invention is the provision of a winding mechanism which simultaneously opens the film gate and moves the film strip therethrough.

Another object of the invention is the provision of such a mechanism by which the film strip may be selectively moved in either direction through the film gate.

A further object of the invention is the provision of an arrangement whereby a selected part of an image carried by a film strip may be projected onto a viewing screen.

Still another object of the invention is the provision of a gate opening mechanism which is operated and controlled by the film winding mechanism and is in proper timed relation thereto.

Yet another object of the invention is the provision of a film gate construction which is so arranged that the opening of the gate is controlled by the film winding mechanism in such a manner that the gate is always open whenever the film strip is moved; and, on the completion of the winding operation, the film gate automatically closes to securely clamp the film strip to hold the latter in a plane for projection.

A still further object of the invention is the provision of a film winding and gate opening mechanism of the class described, which is relatively simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawings:

Fig. 1 is a plan view of a portion of a device for viewing enlarged images of miniature film areas, showing a film winding and gate opening mechanism constructed in accordance with the present invention.

Fig. 2 is an elevation view of the mechanism illustrated in Fig. 1, showing the arrangement of the various parts of the film winding and gate opening mechanism;

Fig. 3 is a view similar to Fig. 1, showing a modified arrangement of a film feeding and gate opening mechanism adapted for use with a viewing device of the class described;

Fig. 4 is an elevation view of the mechanism illustrated in Fig. 3, as viewed from the left of Fig. 3;

Fig. 5 is a side elevation view of a portion of an enlarged device, showing another modification of a film winding and gate operating mechanism constructed in accordance with the present invention;

Fig. 6 is a front elevation view of the mechanism illustrated in Fig. 5, and viewed from the right of the latter, showing the mechanism utilized for scanning the film strip; and Fig. 7 is a view of a portion of the mechanism illustrated in Fig. 5 and taken substantially on the line 7—7 of the latter and looking in the direction of the arrow, showing the arrangement of the film gate parts and the operating means therefor.

Similar reference numerals throughout the various views indicate the same parts.

The present invention relates, in its broadest aspects, to a film winding and gate opening mechanism primarily designed for use in a machine for enlarging small areas of printed matter which have been recorded on miniature film. A machine of this general type is shown and described in the patent to R. S. Hopkins, No. 2,008,982, issued May 23, 1935. The invention is, however, embodied in a mechanism which is not only adapted to move the film strip in either direction through the film gate so as to bring the desired image area of the strip into position to be projected, but also opens the gate prior to the movement of the film strip therein. By means of this arrangement, the gate is always open whenever the film strip is moved, thus preventing scratching or marring of the latter. When, however, the desired picture area has been brought into position in the film gate, the winding mechanism is released, and the gate automatically closes to securely clamp the film in a plane for projecting.

The mechanism of the present invention is adapted to be mounted on the top of a suitable housing or cabinet, not shown, so that the enlarged image may be projected downwardly onto a suitable viewing screen which preferably forms the bottom of the housing. The light source and the optical members, not shown, may also be carried by the housing top. This cabinet, light source, and optical system, may be of any suitable and well known construction, such for example of the general type shown and described in the above-mentioned patent to Hopkins, and need not be herein further described.

Referring now to Fig. 1, there is shown a film winding and gate opening mechanism constructed in accordance with one embodiment of the invention. The gate member, generally indicated by the numeral 11, comprises a stationary member 12 suitably secured to the top of the cabinet, and a movable member 13 slidably mounted thereon. These members are connected by a coil spring 14 which normally tends to move the movable member 13 toward the stationary member 12 to close the gate, as is apparent. Each of the gate members has secured thereto, by screws 15 or other suitable fastening means, a U-shaped metal flange 16 which is adapted to receive and support a strip of transparent sheet material 17, such for example as a glass flat. When the gate is in closed position, the adjacent parallel faces of these glass flats 17 cooperate to clamp an image area of the film strip F to hold said area in flat position for projecting, in a manner clearly shown in Fig. 4. When, however, the film strip is moved to bring another image area into position in the gate, the movable member 13 is slid, in a manner hereinafter described, to separate the glass flats 17, so that the film strip may be readily moved through the gate. In order to prevent marring or scratching of the film strip, the gate opening operation takes place slightly in advance of the film movement, as pointed out later. The frames 19 are formed with registering apertures 18, through which light rays from the light source, not shown, may pass to project the image of the film strip onto the viewing screen.

The rear end of the movable gate member 13 is provided with a pair of spaced depending pins or lugs 20 positioned adjacent the pair of radially projecting arms 21 of a platelike member 22 loosely mounted on the shaft 23. Referring now to Fig. 1, it is apparent that, if the member 22 is rotated in either direction, about the axis of the shaft 23, one of the arms 21 will engage one of the pins 20, thus moving the gate member 13 in the direction of the arrow to open the gate. The particular pins and arm which thus engage obviously depend upon the direction of the rotation of the member 22 on the shaft 23. The member 22 is held in position on the shaft 23 between a pair of spaced upper and lower collars 26 and 27 respectively, each of which is rigidly secured to the shaft 23 by means of a pin 28, or other suitable fastening means. A coil spring 29 is interposed between the lower collar 27 and the lower side or face 30 of the member 22 to yieldably press the upper side or face 31 thereof into frictional engagement with the under side of the upper collar 26, as will be apparent from an inspection of Fig. 2. The engaging surfaces of the member 22 and the collar 26 thus provide, in effect, a friction clutch by which the member 22 may be frictionally driven or moved upon the rotation of the shaft 23, the purpose of which construction will be pointed out later.

The shaft 23 has also mounted on the other end thereof a bevel gear 35, which meshes with a similar gear 36 secured to the shaft 37, which may be rotated by means of an endless chain 38 engaging a sprocket 39 secured to the shaft 37, as clearly shown in Fig. 2. The chain also extends over a similar sprocket 42 secured to the shaft 43, which may be rotated by a suitable hand crank or handle, not shown, in a manner illustrated and described in the above-mentioned patent to Hopkins. It is apparent that the shaft 23 may be rotated in either direction by means of the hand crank, so as to bring one of the arms 21 of the member 22 into engagement with one of the pins 20, as shown in Fig. 1, to move the movable gate member 13 in the direction of the arrow to open the gate. A stop 45 limits the movement of the gate member 13. Engagement of the member 13 with the stop 45, however, not only limits the movement of the gate member 13, but also the rotation of the member 22, as is apparent. Further rotation of the shaft 37 will now cause slipping between the engaged surfaces of the member 22 and the collar 26.

The shaft 23 has loosely mounted thereon, in any suitable well known manner, a pair of spaced grooved pulleys 50, each of which is connected by a belt 51 to a similar pulley 52 secured to a reel spindle 53 adapted to receive a film reel, not shown. A pawl 55 on each of the pulleys 50 is arranged to engage a ratchet 56 secured to and rotatable with the shaft 23, so that the pulleys 50 may be clutched to and rotated with the shaft 23 upon the rotation of the latter. The pawls and ratchet are, however, so arranged that the rotation of the shaft 23 in one direction operatively connect one of the pulleys 50 thereto, and the rotation of the shaft in the opposite direction operatively connects the other pulley thereto. By means of this arrangement, the film strip F may be selectively moved in either direction through the film gate 11 upon the rotation of the hand crank.

The above construction thus permits the winding of the film strip from either of the film reels so as to bring the desired area of the film strip into projecting position in the film gate. The mechanism is, however, so constructed that one of the arms 21 will engage and move the cooperating pin 20 to open the gate just prior to the engagement of one of the pawls 55 with its ratchet 56. Thus the gate 11 will always be open whenever the film strip is moved therein so as to prevent marring or scratching of the strip, the disadvantages of which are well known to those in the art. It is thus apparent that the opening of the film gate and the winding of the film strip are in proper timed relation, and that the gate opening mechanism is operated and controlled by the film winding mechanism. After the desired image area has been brought into position in the film gate, the hand crank is released. The spring 14 then moves the movable member 13 toward the stationary member 12 to clamp the film strip F in flat position for projecting. This movement of the gate member 13 carries the pin 20 so as to move the engaging arm 21 of the member 22 to rotate the latter to the position shown in full line, Fig. 1.

Referring now to Figs. 3 and 4, there is shown a slightly modified arrangement by which the film gate 11 may be opened as the film strip F moves in either direction therethrough. The parts corresponding to Figs. 1 and 2 are designated by the same numerals. A flat member 60 of the shape best shown in Fig. 3, is loosely mounted on the shaft 23 and is held in position thereon between spaced collars 61 and 62 which are secured to the shaft 23 by pins 63, or other suitable fastening means. This arrangement is somewhat similar to that shown in Fig. 2. A flat spring 65, of the shape best shown in Fig. 4, is positioned between the lower collar 62 and the member 60 to yieldably press the latter into frictional engagement with the underside of the upper collar 61. The engaging surfaces of the member 60 and the collar 61 thus provide a friction clutch by means of which the member 60 may be rotated upon rotation of the shaft 23 in either direction. When the member 60 is thus rotated, it engages one of the pins 20 of the movable gate member 13 to open the gate, as described in connection with Figs. 1 and 2.

A gear 70 is secured to the under side of the lower collar 62 so as to rotate as a unit therewith. While the collar 62 and the gear 70 are preferably made as separate units and then fastened together, it is contemplated that these members may be formed integral if desired. The gear 70 meshes with and drives a pair of pinions 71 loosely mounted on spindles 72 carried by the opposite ends of the member 60, as clearly illustrated in Fig. 3. Sleeves or bushings 73 surround the spindles 72 and are interposed between the arm 60 in the gears 71 so as to position the latter in the plane of the gear 70, as shown in Fig. 4. By means of this arrangement, the rotation of the shaft 23 will rotate the gear 70 and hence the gears 71, the latter, however, rotating in opposite directions as is apparent.

The initial rotation of the shaft 23 in either direction will first move the member 60 into engagement with one of the pins 20 to open the gate 11, the stop 45 limiting said movement. Further rotation of the shaft will now bring one of the gears 71 into mesh with a gear 75 secured to the end of one of the reel spindles 53, as shown in Fig. 3, the member 60 slipping on the collar 61 during this further rotation. When the gear 71 has been thus moved into engagement with the gear 75, further rotation of the shaft 23 by the hand crank will rotate the reel spindle 53 to wind the film strip onto the film reel positioned thereon. However, rotation of the shaft 23 in the opposite direction will first open the film gate 11 and then move the other gear 71 into engagement with the gear 75 on the other reel spindle 53. Thus, either spindle may be selectively connected to and rotated by the winding handle or crank, the film gate being opened in timed relation with the movement of the film, as in the case of the construction shown in Figs. 1 and 2. It is thus apparent that, in this embodiment, the gate opening mechanism is also operated and controlled by the film winding mechanism.

It is evident upon inspection of Fig. 3 that, when one of the gears 71 engages the cooperating gear 75, the center of the gears 70, 71 and 75 are not in alignment. Such an arrangement thus affords, in effect, a toggle, one arm of which constitutes the imaginary line connecting the centers of the gears 71 and 75, and the other arm comprises the imaginary line connecting the center of the gears 70 and 71. Rotation of the shaft 23 tends to straighten out these toggle arms, thus securely holding the gear 71 in meshing engagement with the gear 75, the force tending to straighten the toggle arms being applied at the spindle 72 about which the gear 71 rotates. After the film has been moved to bring the desired image area into position in the film gate 11, the winding crank is released. The spring 14 then closes the gate, thus causing one of the pins 20 to engage the member 60 to move the latter to the inoperative or full line position shown in Fig. 3. If desired, an auxiliary coil spring 80 may be utilized to assist in returning the member 60 to its inoperative position. This spring 80 has one end thereof secured to one of the spindles 72, while the other end is anchored to a post 81 secured to the machine casing, as clearly illustrated in Fig. 3.

Referring now to Figs. 5 to 7, there is shown still another modification of the gate opening and film winding mechanism for projector. Parts corresponding to those in the above described figures will be designated by the same numerals. In this embodiment, the stationary and movable gate members 90 and 91 respectively are in the form of flat plates, of the shape best shown in Fig. 5. The coil spring 14 connects these gate members and thus tends to hold them in closed position, as shown in Figs. 5 and 7. These plates are also provided with cooperating glass flats 17 between which the film strip F is clamped, and are formed with the registering apertures 18, through which the light rays may pass. The stationary member 90 is secured by rivets 93, or other fastening means, to a plate 94, the purpose of which will be hereinafter pointed out. The lower end of the stationary gate member 90 is formed to provide a pair of substantially parallel plate members or wings 97, which overlie a pair of corresponding plate members or wings 98 formed on the lower portion of the movable gate member 91, all as clearly shown in Figs. 5 and 7. A U-shaped member 100 overlies the members 97 and is connected to the members 98 by means of rivets 101 extending through elongated slot 102 in the members 97, as shown in Fig. 7. Thus, when the member 100 is moved, by a mechanism to be later described, in the direction of the arrow, Fig. 5, the movable gate member 91 is moved to open the gate. Upon release of the member 100, however, the spring 14 moves the movable member 91 toward the stationary member 90 to close the gate, as is apparent. The movable gate member 91 and the U-shaped member 100 are thus supported by the stationary gate member 90, which in turn is carried by the plate 94, so that the latter may be broadly considered as supporting means for both of the gate members.

A rectangular bracket 105 is supported from the machine casing 106, and has mounted in the opposite arms 107 thereof a shaft or spindle 108, on which is loosely mounted a pair of spaced grooved pulleys 109, similar to the pulleys 50. These pulleys 109 are connected by belts 51 to the pulleys 52 mounted on the reel spindle 53 which carry the reel films 110. A helical gear 115 is also rotatably and slidably mounted on the shaft 108 intermediate the pulleys 109, and engages a complementary helical gear 116 mounted on the shaft 117 carried by the side arm 118 of the bracket 105. The shaft 117 may be connected to a suitable control means, such for example as the chain drive 38 shown in Fig. 1, by which the shaft 117 may be rotated in either direction. A pair of flat T-shaped members 120 of any suitable material, preferably metal, are pivotally mounted at 121, on the other side arm 122 of the bracket 105, as clearly shown in Fig. 5. The stem 123 of these T-shaped members 120 are provided with laterally projecting pins 124 which diametrically extend into a circumferential groove or slot 125 of a collar 126 formed integral with or rigidly secured to the side of the helical gear 115. Arms 127 of the two T-shaped members 126 are rigidly connected by cross pieces 128 positioned on opposite sides of the pivot point 121, see Fig. 5. The curved ends of the arms 127 engage elongated bearing surfaces 130 formed on connecting portions of the U-shaped member 100.

Referring now to Fig. 5, it is apparent that, if the gear 115 is slid axially of the shaft 108, this movement, by reason of the engagement of the pins 124 in the slot 125, will pivot the member 126 upon its pivot point 121. This pivoting of the member 126 will cause the ends of one of the arms 127 thereof to engage the adjacent bearing surface 130 of the member 100 to move or slide the latter to the right, as viewed in Fig. 5. As the member 100 is connected, by rivets 101, to the members or wings 98, the movable gate member 91 will also be moved to the right to open the gate 11.

As is well known, the rotation of a pair of helical gears will impart an axial thrust to the driven gear members. This thrust will cause the gear 115 to slide axially on the shaft 108 to pivot the member 126 and in turn move the member 100 and the movable gate member 90 to open the gate as above described. As the gear 115 slides along the shaft 108, a tooth clutch member 132 thereof finally engages a complementary tooth clutch member 133 carried by the pulleys 109 to connect one of the pulleys to the gear 115. Engagement of these clutch members, however, occurs after the opening of the gate, so that the latter will always be open whenever the film strip moves therein. The particular pulley 109 which is connected to the gear 115 depends, of course, on the direction or movement of the gear 115, as will be apparent to those in the art.

After one of the pulleys 109 has been thus clutched to the gear 115, further rotation of the shaft 117 will rotate one of the reel spindles 53 to wind the film strip onto the film reel 110. It is thus apparent that either of the reel spindles 53 may be selectively connected to the winding mechanism so that the film strip may be wound in either direction through the film gate to bring the desired image area into position therein. It is also apparent that the gate opening mechanism is operatively connected to and controlled by the film winding mechanism in timed relation thereto. When the desired film area has been brought into position in the film gate, the hand crank may be released. The coil spring 14 will then move the gate member 91 and the member 100 to the left, as viewed in Fig. 5. This movement of the member 100 will pivot the member 126 about its pivot 121 to slide the gear 115 axially to disengage the clutch members 132 and 133.

The arrangements embodied in the present application are primarily designed for enlarging small areas of printed matter reduced to extremely minute size on photographic film. In order that the area enlarged may be of sufficient size to read, while at the same time providing a projecting apparatus of convenient size, the area projected at one time is approximately one-quarter of the full size of the image, as fully described in the above-mentioned patent to Hopkins, and illustrated in Fig. 5 thereof. To this end, means may be provided for scanning the film strip so that the various one-quarter areas may be brought into projecting position.

Referring again to Figs. 5 to 7, there is shown an arrangement for scanning the film strip. As pointed out above, the stationary gate member 90 is secured by rivets 93 to a plate 94. This plate is also provided with apertures, not shown, through which the reel spindle 53 may project. Sleeves 135 surround each of the spindles 53 and are interposed between the plate 94 and the film reels 110 to position the latter relative to the film gate. These sleeves, as well as the spindles 53, project through openings 136 formed in the horizontal portion 137 of the machine casing. The lower portion of the right hand spindle 53, Fig. 6, is journaled in a sleeve bearing 138 which is preferably, although not necessarily, formed integral with the adjacent sleeve 135. The lower portion of the left hand spindle 53, Fig. 6, is supported in a bearing 139 which is carried by a bracket 140, depending from the under side of the plate 94 and secured thereto by screws 141, or other suitable fastening means.

The ends of the plate 94 have mounted thereon a pair of depending sleeves 145 which are slidably mounted on guide rods 146 suitably secured to the under side of the horizontal portion 137 of the machine casing. When these sleeves are moved, in a manner to be described presently, relative to the guides 146, the plate 94, the film gate 11 and the film reels 110 are moved as a unit relative to the stationary lens barrel 150, so that the film strip may be moved across the axis of the optical member in the barrel to permit scanning of the film strip, as is well known to those in the art.

This movement of the sleeves 145 may be secured, for example, by means of cams 151, which are mounted on a shaft 152 journaled in bearings 153 formed on or secured to depending side portions 154 of the machine casing. The shaft 152 may be rotated by a suitable crank, not shown. Thus, when the shaft 152 is rotated, the cams 151 will engage the lower surfaces 155 of the sleeves 145 to lift the latter, the plate 94, the film reels 110 and the film gate 11. In order to permit the movement of the cams 151, the lower end of the guide rods 146 are slotted at 156 to receive the cams, as shown in Fig. 6.

By means of the above arrangement, the shaft 117 may be selectively rotated in either direction to move the film strip in the desired direction through the film gate. Prior to such movement, however, the film gate is automatically opened to prevent scratching or marring of the film strip. Furthermore, the film strip may be moved across the optical field to permit scanning of the strip, for the reasons above pointed out.

It is thus apparent from the above description, that the present invention provides an arrangement for simultaneously opening the film gate and for moving the film strip therein. The opening of the film gate is in proper timed relation to the movement of the film strip so that the gate will always be open when the strip is moved therethrough. Furthermore, the gate opening mechanism is operated and controlled by the film winding mechanism. In addition, the film strip may be moved in either direction through the film gate at the will of the operator so as to bring or return a desired image area into projecting position.

While certain embodiments of the invention have been disclosed, it is to be understood that the inventive ideas may be carried out in a number of ways. This application is, therefore, not to be limited to the precise details described but is intended to cover all variations and modifications thereof falling within the spirit of the invention and the scope of the appended claims.

What I claim is:

1. A device for projecting enlarged images comprising, in combination, a support, a film gate having a stationary member mounted on said support and a movable member slidably mounted on and supported by said stationary member and movable relative thereto to open and close said gate, means resiliently connecting and tending to hold said members in a closed position, spindles positioned on opposite sides of said gate and adapted to support reels on which a film strip may be wound, a drive shaft, a clutch slidably mounted on said support and operatively connected to said shaft so as to be actuated by the rotation thereof in either direction to connect one of said spindles to said shaft to move said strip through said gate, and means operated by the sliding of said clutch to open said gate in timed relation to the movement of said strip therethrough.

2. A device for projecting enlarged images comprising, in combination, a support, a film gate having a stationary member mounted on said support and a movable member slidably mounted on said stationary member and movable relative thereto to open and close said gate, means tending to hold said members in closed position, spindles positioned on opposite sides of said gate and adapted to support reels on which a film strip may be wound, a drive shaft, a thrust member operatively connected to said shaft and slidably mounted on said support, clutch members on said thrust member, said thrust member being slidable upon said support upon rotation of said shaft to move one of said clutch members into driving engagement with one of said spindles to move said strip through said gate, and a pivoted member on said support operatively connecting said movable gate member and said thrust member so that the sliding movement of the latter will serve to move said movable gate member to open said gate prior to the engagement of said clutch members.

3. A device for projecting enlarged images comprising, in combination, a support, a film gate having a stationary member mounted on said support and a movable member slidably mounted on said stationary member and movable relative thereto to open and close said gate, means tending to hold said members in closed position, spindles positioned on opposite sides of said gate and adapted to support reels on which a film strip may be wound, a drive shaft, a gear slidably mounted on said support and driven from said shaft, clutch members formed on said gear, said gear and clutch members being simultaneously slid axially on said support upon rotation of said gear to operatively connect one of said clutch members to one of said spindles to rotate the latter to move said strip through said gate, and a member pivoted on said support and connecting said movable gate member and said gear so that the sliding movement of the latter actuates said movable gate member to move the latter relative to said stationary member to open said gate, said gate opening being in timed relation to the movement of said strip.

4. A device for projecting enlarged images comprising, in combination, a support, a film gate having a stationary member mounted on said support and a movable member slidably mounted on said stationary member and movable relative thereto to open and close said gate, means tending to hold said members in closed position, spindles positioned on opposite sides of said gate and adapted to support reels on which a film strip may be wound, a drive shaft, a gear slidably mounted on said support and operatively connected to and adapted to be rotated in opposite directions by said drive shaft, clutch members formed on the opposite faces of said gear, the rotation of said gear in either of said directions also acting to simultaneously slide the gear on said support to move one of said clutches into driving engagement with one of said spindles to rotate the latter to move said strip through said gate, a plate member secured to and movable as a unit with said movable gate member, a gate actuating portion pivotally mounted on said support and formed with laterally extending arms adapted to engage said plate member, and a stem on said actuating portion connected to said gear so that the sliding movement of the latter serves to pivot said portion to bring one of said arms into engagement with said plate member to move the latter and said movable gate member to open said gate.

5. A device for projecting enlarged images comprising, in combination, a support, a film gate having a stationary member mounted on said support and a movable member slidably mounted on said stationary member and movable relative thereto to open and close said gate, means tending to hold said members in closed position, spindles positioned on opposite sides of said gate and adapted to support reels on which a film strip may be wound, a drive shaft, a clutch slidably mounted on said support and operatively connected to said shaft so as to be actuated by the rotation thereof in either direction to connect one of said spindles to said shaft to move said strip through said gate, means operated by the sliding of said clutch to open said gate in timed relation to the movement of said strip therethrough, and means for moving said spindles in a direction transverse to the movement of the strip through said gate to permit scanning of said strip.

6. A device for projecting enlarged images comprising, in combination, a support, a plate, means for movably mounting said plate on said support, a film gate mounted on and movable as a unit with said plate, said gate comprising a stationary member and a movable member, means tending to move said movable member toward said stationary member to close said gate, spindles carried by said plate and positioned on opposite sides of said gate to support reels on which a film strip may be wound, a clutch slidably mounted on said support and operatively connected to said shaft, the rotation of the latter in either direction serving to slide said clutch on said support and into operative engagement with one of said reels to connect the latter in driving engagement with said shaft to move said strip through said gate, means controlled by the sliding of said clutch for moving said movable member away from said stationary member to open said gate in timed relation to the movement of said strip therethrough, and independent means for actuating said plate to move said gate and said reels in a direction transverse to the movement of said strip through said gate to permit scanning of said strip.

7. A device for projecting enlarged images comprising, in combination, a film gate, said gate comprising a stationary member and a movable member, resilient means connecting said members and tending to move said movable member toward said stationary member to close said gate, a pair of spindles positioned on opposite sides of said gate and adapted to support reels on which a film strip may be wound, a shaft, means for manually rotating said shaft in opposite directions, a helical gear mounted on and rotatable with said shaft, a second helical gear meshing with said first gear, a support on which second gear is slidably mounted, pulleys loosely mounted on said support, cooperating clutch members on said pulleys and said second gear, said second gear being slidable axially in one direction on said support when said shaft is rotated in one direction to clutch one of said pulleys to said second gear, said second gear being slidably axially in the opposite direction to clutch the other pulley thereto when said shaft is rotated in the opposite direction, a member pivotally mounted on said support and operatively connecting said movable gate member to said second gear so that the axial movement of the latter will move said movable member to open said gate, and drive belts connecting said pulleys to said spindles.

8. A device for projecting enlarged images comprising, in combination, a film gate, said gate comprising a stationary member and a movable member, resilient means connecting said members and tending to move said movable member toward said stationary member to close said gate, and spindles adapted to support reels on which a films trip may be wound, a plate which carries said gate member and on which said spindles are revolvably mounted, a shaft, means for manually rotating said shaft in opposite directions, a helical gear mounted on and rotatable with said shaft, a second helical gear meshing with said first gear, a support on which second gear is slidably mounted, pulleys loosely mounted on said support, cooperating clutch members on said pulleys and said second gear, said second gear being slidable axially in one direction on said support when said shaft is rotated in one direction to clutch one of said pulleys to said second gear, said second gear being slidable axially in the opposite direction to clutch the other pulley thereto when said shaft is rotated in the opposite direction, a member pivotally mounted on said support and operatively connecting said movable gate members to said second gear so that the axial movement of the latter will move said movable member to open said gate, drive belts connecting said pulleys to said spindles to rotate the latter upon rotation of said pulleys, and means including a cam for moving said plate in a direction normal to the movement of said strip through said gate to permit scanning of said strip.

ALVIN E. SCHUBERT.